United States Patent [19]

Vaughan et al.

[11] Patent Number: 4,657,748

[45] Date of Patent: Apr. 14, 1987

[54] CRYSTALLINE ZEOLITE (ECR-1) AND PROCESS FOR PREPARING IT

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 713,050

[22] Filed: Mar. 18, 1985

[51] Int. Cl.[4] ............................................. C01B 33/28
[52] U.S. Cl. .................................. 423/328; 423/329; 502/64
[58] Field of Search ............... 423/328, 328 T, 329 T; 502/64

[56] References Cited

U.S. PATENT DOCUMENTS

| | | | |
|---|---|---|---|
| 3,216,789 | 11/1965 | Breck et al. | 23/113 |
| 3,433,589 | 3/1969 | Ciric et al. | 23/113 |
| 3,578,723 | 5/1971 | Bowes et al. | 423/328 |
| 3,808,326 | 4/1974 | McDaniel et al. | 423/329 |
| 3,867,512 | 2/1975 | Young | 423/328 |
| 4,021,447 | 5/1977 | Rubin et al. | 423/328 T |
| 4,046,859 | 9/1977 | Plank et al. | 423/328 T |
| 4,178,352 | 12/1979 | Vaughan et al. | 423/329 |
| 4,495,303 | 1/1985 | Kuehl | 423/328 T |

FOREIGN PATENT DOCUMENTS

0063436 10/1982 European Pat. Off. ........ 423/328 T

OTHER PUBLICATIONS

Rollmann, "Synthesis of Zeolites, an Overview", *Zeolites: Science and Technology*, pp. 109–126 (1983).
Barrer, R. M., "Hydrothermal Chemistry of Zeolites", 1982, Academic Press, pp. 157–174.
Lok et al., *Zeolites*, vol. 3, (1983) p. 282.

*Primary Examiner*—John Doll
*Assistant Examiner*—Lance Johnson
*Attorney, Agent, or Firm*—E. Thomas Wheelock; Henry E. Naylor

[57] ABSTRACT

A synthetic crystalline zeolite is provided characterized by having a composition, in terms of mole ratios of oxides, in the range:

0.1 to 0.02 $R_2O:0.90$ to 0.98 $Na_2O:Al_2O_3:5$ to 20 $SiO_2:0$ to 8 $H_2O$ wherein R represents a bis-(2-hydroxyethyl) dimethylammonium group, and characterized by having atoms arranged in a structure as indicated by a specified x-ray powder diffraction pattern. The zeolite may be prepared by crystallization from an aged reaction mixture of an oxide of sodium, a bis-(2-hydroxyethyl) dimethylammonium salt, water, a source of silica, a source of alumina, and sodium aluminosilicate nucleating seeds in specified relative amounts.

15 Claims, No Drawings

CRYSTALLINE ZEOLITE (ECR-1) AND PROCESS FOR PREPARING IT

FIELD OF THE INVENTION

This invention relates to a novel crystalline zeolite designated herein as ECR-1 and a process for its preparation. In particular, the zeolite has a $SiO_2$ to $Al_2O_3$ ratio of from 5:1 to 20:1 and contains a bis-(2-hydroxyethyl)- or a bis-(2-hydroxypropyl)-dimethylammonium cation.

BACKGROUND OF THE INVENTION

The use of quaternary ammonium salts as templates or reaction modifiers in the preparation of synthetic crystalline zeolites, first discovered by R. M. Barrer in 1961, has led to preparation of zeolites with high silica to alumina ratios which are not found in nature. Reviews by Barrer ("Hydrothermal Chemistry of Zeolites", Academic Press, 1982) and Lok et al (Zeolites, vol. 3 (1983), p. 282) show the large number of zeolites that can be made in various organic template systems. A number of those zeolites may also be made without the templates. Although some zeolites are characterized as being made in the presence of but a single template, that same template may be used in the crystallization of a variety of zeolites. The type zeolite which is produced is, in addition, a function of the reaction mixture composition, reaction and nucleation conditions and other variables that influence these metastable crystallization systems.

SUMMARY OF THE INVENTION

This invention is a novel zeolite which, for purposes of convenience, shall be designated herein as ECR-1. The chemical composition of ECR-1 may be stoichiometrically expressed in terms of mole ratios of oxides as follows:

$$0.1 \text{ to } 0.02 R_2O : 0.90 \text{ to } 0.98 Na_2O : Al_2O_3 : 5 \text{ to } 20 SiO_2 \cdot xH_2O$$

where R is a bis-(2-hydroxyethyl)- or bis-(2-hydroxypropyl)-dimethylammonium or similar cation and x is 0 or an integer from 1 to 8. The zeolite herein is also characterized by having a structure indicated by an x-ray powder diffraction pattern having the main peaks given in Table I below. Furthermore, the fact that the material traps molecules at the dimethyl- or diethylammonium species indicates that cages or channels larger than sodalite or gmelinite cages are present therein.

The zeolite ECR-1 may be used as a sorbent or as a catalyst, e.g., as a hydrocarbon conversion catalyst for, e.g., paraffin isomerization, aromatization, and alkylation or the hydrocracking of lube stocks and fuels.

The invention also deals with a method for preparing ECR-1 by the steps of:

(a) preparing a reaction mixture comprising an oxide of sodium, an organic ammonium salt, water, a source of silica, a source of alumina and sodium aluminosilicate nucleating seeds, said reaction mixture having a composition, in terms of mole ratios of oxides, within the following ranges:

| | |
|---|---|
| $R_2O:Al_2O_3$ | 0.2 to 1.0 |
| $Na_2O:Al_2O_3$ | 1 to 7 |
| $SiO_2:Al_2O_3$ | 5 to 20 |
| $H_2O:Al_2O_3$ | 120 to 130 |
| $R_2O:Na_2O$ | 0.05 to 0.4 | where R represents a tetraalkyl ammonium cation of the type $(CH_3)_2R^1_2N$ where $R^1$ is an ethyl, propyl or butyl grouping; especially where R is a bis-(2-hydroxypropyl)- or a bis-(2-hydroxyethyl)dimethylammonium or like group. Seeds may be present in an amount sufficient to yield 0.1 to 20.0 mole percent of the total final alumina content in the zeolite synthesis slurry;

(b) blending the reaction mixture sufficiently to form a substantially homogeneous mixture;

(c) maintaining the reaction mixture at between about 120° and 200° C. under autogenous pressure for a sufficient period of time to form crystals of the zeolite ECR-1 having the composition first described above; and (d) recovering the zeolite crystals.

It will be understood that the compositions may contain some waters of hydration (the x value above) which may be at least partially removed when the zeolites are employed as sorbents or catalysts. In addition, the cations in the zeolite as originally synthesized may be subsequently exchanged with elements from Groups I through VIII of the Periodic Table.

DESCRIPTION OF THE PREFERRED EMBODIMENTS

The zeolite of this invention is characterized by the x-ray powder diffraction pattern given in Table I. The tentative indexing is orthorhombic (a=26.3 Å, b=18.3 Å and c=7.3 Å,) and may be orthorhombic in other exchanged forms. The morphology of ECR-1 is characteristically long laths or needles with an aspect ratio of about 10 when using the disclosed preparations.

TABLE 1

| Major Lines in the X-ray Diffraction Pattern of ECR-1 | |
|---|---|
| dÅ | Intensity |
| 14.8 ± .2 | weak |
| 10.6 ± .2 | medium |
| 9.1 ± .2 | strong |
| 7.8 ± .2 | medium |
| 5.8 ± .2 | medium-strong |
| 4.22 ± .1 | medium |
| 3.72 ± .1 | medium |
| 3.67 ± .1 | strong |
| 3.57 ± .1 | medium |
| 3.48 ± .1 | strong |
| 3.16 ± .1 | v. strong |
| 3.06 ± .1 | medium |
| 3.00 ± .1 | medium-strong |

Minor variations in the mole ratios of the oxides within the ranges given in the chemical composition for ECR-1 do not substantially alter the structure or properties of the zeolite. In addition, the number of waters of hydration x in the formula will not be the same for each preparation and will depend on the type of exchangeable cation employed and on the degree to which the zeolite is dried.

The exchangeable cations which may partially or fully replace the cations found in the assynthesized zeolite ECR-1 in a subsequent ion exchange method may be cations of metals from any one of Groups I to VIII of the Periodic Table or rare earth metals, depending on the end use desired. Preferably, the cations will be mono-, di- and trivalent metal cations, particularly from Groups I, II or III of the Periodic Table such as barium, calcium, cesium, lithium, magnesium, potassium, sodium, strontium, zinc, and the like, or hydrogen or ammonium or alkylammonium ions, or rare earth metals. The presence of these exchangeable cations will generally not cause a substantial alteration of the basic crystal structure of the zeolite. Particularly preferred are mono- and divalent cations, as they are more easily included in the pores of the zeolite crystal. Any ion exchange technique may be employed such as those discussed, for example, in U.S. Pat. No. 3,216,789.

A particularly preferred zeolite herein has a composition in terms of mole ratios of oxides in the range:

$$0.05 \text{ to } 0.02 R_2O:0.95 \text{ to } 0.98 Na_2O:Al_2O_3:5 \text{ to } 10 SiO_2$$

A zeolite ECR-1 may be prepared by a process in which a reaction mixture, generally a slurry, is formed comprised of an oxide of sodium, water, a tetraalkylammonium salt as discussed above, a source of silica, a source of alumina and sodium zeolite (aluminosilicate) nucleating seeds. The oxide of sodium may be, e.g., sodium hydroxide, and the tetraalkylammonium salt may be a sulfate, nitrate, phosphate or halide salt, and is preferably a halide such as the chloride, iodide or bromide salt or a hydroxide. The silica is derived from preferably sodium silicate. The alumina may be derived from sources such as, e.g., alumina trihydrate, sodium aluminate, alum, kaolin, metakaolin or the like. It is noted that the sodium oxide may be provided not only directly by adding, e.g., sodium hydroxide to the mixture, but also indirectly from the source of silica and/or the source of alumina if, for example, sodium silicate and sodium aluminate (prepared by dissolving NaOH and $Al_2O_3.3H_2O$ in water) are respectively employed as at least one of the silica and alumina sources. The preferred source of alumina is an aluminum salt selected from the chloride, sulfate and nitrate salts.

The aluminosilicate nucleating seeds which are also required in the reaction mixture, also known as zeolite nucleation centers, consist of a slurry of zeolite solids having the following components: $SiO_2$, $Al_2O_3$, $Na_2O$ and $H_2O$. Generally, the seeds should have an average particle size less than about 0.1 microns. The composition of the nucleating seeds in the slurry may be in the approximate ranges, in terms of mole ratios of oxides, as follows:

$$4 \text{ to } 30 Na_2O:1 \text{ to } 9 Al_2O_3:3 \text{ to } 30 SiO_2:250 \text{ to } 2000 H_2O$$

Such slurries of nucleating seeds may be prepared by the process disclosed in U.S. Pat. Nos. 3,433,589; 3,808,326; and 4,178,352, the disclosure of which are incorporated herein by reference. In general, the preparation procedure involves mixing appropriate amounts of sodium silicate, sodium aluminate and water together and aging the resulting slurry at about 0° to 90° C. for about 1 to 500 hours, with lower temperatures requiring a longer period of time. Preferably, the slurry is aged at ambient temperatures for about 20 to 400 hours and the zeolitic centers have compositions in the range:

$$10 \text{ to } 16 Na_2O:1 \text{ to } 9 Al_2O_3:10 \text{ to } 15 SiO_2:250 \text{ to } 2000 H_2O$$

The amount of nucleating seeds which must be present in the reaction mixture is expressed in terms of the percentage of the total molar alumina content in the zeolite slurry. Thus, for example, if 5 molar percent of the nucleating seeds is added to the mixture, the seeds are contributing 5% of the total molar amount of alumina in the zeolite slurry. In general, the seeds are present in an amount to yield 0.1 to 10 mole percent of the total alumina content of the slurry, and preferably 2 to 6 mole percent.

As an additional requirement, the relative amounts of ingredients in the reaction mixture will be such that the mixture will have a composition, in terms of mole ratios of oxides, within the following ranges:

| Oxide Constituents | Ranges of Mole Ratios |
| --- | --- |
| $R_2O:Al_2O_3$ | 0.2 to 1.0 |
| $Na_2O:Al_2O_3$ | 1.0 to 7 |
| $SiO_2:Al_2O_3$ | 5 to 20 |
| $H_2O:Al_2O_3$ | 120 to 300 |
| $R_2O:Na_2O$ | 0.05 to 0.4 | where R represents a tetraalkylammonium group as defined above.

In one preferred method of preparation of sodium silicate solution, a slurry of nucleating seeds and a bis-(2hydroxyethyl)dimethylammonium halide solution are added to a blender, followed by slow addition, with mixing, of a sodium aluminate solution and an alum solution. Then additional water is added to the resulting slurry. The reaction mixture is ordinarily prepared in a container made of glass, metal, teflon or the like which should be closed to prevent water loss.

After the reaction mixture is formed it is homogenized by thorough blending so as to be substantially homogeneous in texture. This step is to help insure that the zeolite product ultimately obtained is not a mixture of products. The mixing may take place in any vessel in which complete mixing can be effected.

The homogenized mixture is then placed in a reactor, ordinarily one which can withstand elevated pressures such as an autoclave or other pressure reactor, where it is maintained at a temperature of between about 120° and 200° C., preferably 150° and 180° C., and, for commercial purposes, preferably no greater than 200° C. The exact temperature will depend, for example, on the amount of sodium oxide present and the length of time employed for reaction. At temperatures much above about 200° C. the zeolites obtained are not commercially acceptable due to major crystallization of impurities. Below 100° C., faujasite is formed as a major product. The homogenized mixture is heated and maintained at autogenous pressures which will depend on the temperature employed. Lower pressures of 5 atm may be adequate for temperatures at the lower range but at higher temperatures up to 200° C., pressures of up to about 25 atm or higher may be achieved. The amount of time required for heating will depend mainly on the temperature employed, so that at 120° C. the heating may be carried out, e.g., for more than 12 days, whereas at, e.g., 160° C. or more the time period may be, e.g., 4 to 12 days. In any event the heating is carried out until crystals are formed of the zeolite product, i.e., ECR-1, having the following range of composition:

$$0.1 \text{ to } 0.02 R_2O:0.90 \text{ to } 0.98 Na_2O:Al_2O_3:5 \text{ to } 20 SiO_2:xH_2O$$

where R and x are as defined above. The product zeolite ECR-1 is also characterized by having an x-ray powder diffraction pattern which is essentially the same as that shown in Table I above.

The crystallization time may be shortened, if desired, by seeding the slurry before or after the blending step with minor amounts of zeolite ECR-1 crystals of this invention, which are preferably crushed or chopped at temperatures of about 77° K. under liquid nitrogen for about 1 to 10 minutes before seeding to render them microcrystalline, e.g., less than about 0.1 microns.

The product zeolite crystals, may be recovered by filtration from the reaction mixture. Typically they are washed, preferably with distilled water, to separate them from the mother liquor. The washing should continue, for best purity results, until the wash water, equilibrated with the product, has a pH of between about 9 and 12. After the washing step the zeolite crystals may be dried or calcined if removal of the trapped organic template is desired. Characteristically, the trapped dimethyldiethyl ammonium cation decomposes and evolves from ECR-1 at a temperature of between about 440° and 500° C. Decomposition and evolution of the same cation trapped in mazzite takes place between about 320° and 360° C. Tetramethylammonium (TMA) cations are decomposed and evolved from TMA-Z K4 at temperatures over 550° C.

The zeolite ECR-1 of this invention may be used as a sorbent or as a catalyst. To be employed for these applications, the zeolite may be at least partially dehydrated by drying at temperatures of up to about 500° C. or more until most or all of the water of hydration is removed along with the trapped organic cations.

The examples which follow illustrate the efficacy of the invention. In all examples, parts and percentages are given by weight and temperatures in degrees Centigrade unless otherwise noted.

EXAMPLE 1

A slurry having a composition, in terms of mole ratios of oxides, of

| | |
|---|---|
| $R_2O:Al_2O_3$ | 0.6 |
| $Na_2O:Al_2O_3$ | 1.94 |
| $SiO_2:Al_2O_3$ | 7.48 |
| $H_2O:Al_2O_3$ | 109 | wherein R is a bis-(2-hydroxyethyl)dimethylammonium cation was prepared as follows: A sodium aluminate solution was produced by dissolving 8.23 g (0.206 mole) of NaOH and 14.6 g (0.0936 mole) of $Al_2O_3.3H_2O$ in 20 ml of water. An alum solution was made by dissolving 34.7 g (0.0535 mole) of $Al_2(SO_4)_3.17H_2O$ in 50 ml of water. To a blender was added 229 g of a sodium silicate solution (composed of 8.9% $Na_2O$, 28.7% $SiO_2$ and 62.4% $H_2O$), 8.0 g of a slurry of zeolitic nucleation seeds having a composition, in terms of mole ratios of oxides, as follows:

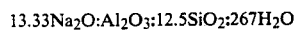

aged at 25° C. for at least one day but not longer than two weeks as described in U.S. Pat. No. 4,178,352, and a solution of 25 g (0.147 mole) of bis-(2-hydroxyethyl)-dimethylammonium chloride dissolved in 25 ml of water. The sodium aluminate and alum solutions described above were then slowly added to the blender with mixing. Sufficient water was added to bring the total weight of the slurry to 440 g. After thorough homogenization of the mixture it was transferred to a polytetrafluoroethylene-lined pressure reactor, sealed, and placed in a 160° C. oven for eight days. The white solid product obtained was recovered by filtration, washed with water, and dried in a 110° C. oven. The dried zeolite appeared to be sheaves or laths about 10 to 20 microns long and about 1 micron in diameter and had an estimated chemical composition of:

where R is a bis-(2-hydroxyethyl)dimethylammonium cation. The crystals were found to have the x-ray powder diffraction pattern given in Table II and contained minor amounts of analcite.

TABLE II

| X-Ray Diffraction Pattern Characteristic of ECR-1 | | | | | |
|---|---|---|---|---|---|
| 2θ | dÅ | I/Io | 2θ | dÅ | I/Io |
| 6.01 | 14.69 | 5 | 29.15 | 3.06 | 11 |
| 8.33 | 10.60 | 5 | 29.74 | 3.00 | 23 |
| 9.76 | 9.05 | 25 | 34.42 | 2.603 | 5 |
| 11.30 | 7.82 | 20 | 35.12 | 2.553 | 3 |
| 13.12 | 6.74 | 11 | 36.31 | 2.472 | 9 |
| 13.51 | 6.55 | 3 | 40.30 | 2.236 | 11 |
| 15.08 | 5.81 | 8 | | | |
| 15.53 | 5.70 | 100 | | | |
| 16.77 | 5.28 | 3 | | | |
| 17.63 | 5.03 | 6 | | | |
| 17.78 | 4.98 | 6 | | | |
| 18.77 | 4.73 | 6 | | | |
| 21.02 | 4.22 | 24 | | | |
| 21.27 | 4.17 | 8 | | | |
| 23.3 | 3.81 | 8 | | | |
| 23.82 | 3.73 | 17 | | | |
| 24.16 | 3.68 | 25 | | | |
| 24.87 | 3.58 | 20 | | | |
| 25.49 | 3.48 | 45 | | | |
| 26.71 | 3.33 | 44 | | | |
| 28.19 | 3.16 | 110 | | | |

EXAMPLE 2

A slurry having a composition, in terms of mole ratios of oxides, of:

| | |
|---|---|
| $R_2O:Al_2O_3$ | 0.6 |
| $Na_2O:Al_2O_3$ | 3.1 |
| $SiO_2:Al_2O_3$ | 9.2 |
| $H_2O:Al_2O_3$ | 130 | wherein R is a bis-(2-hydroxyethyl)dimethylammonium cation was prepared as follows: A sodium aluminate solution was produced by dissolving 5.1 g (0.13 mole) of NaOH and 6.6 g (0.042 mole) of $Al_2O_3.H_2O$ in 12 ml of water at about 100° C. An alum solution was made by dissolving 11.14 g (0.0172 mole) of $Al_2O_3.17H_2O$ in 15 ml of water. To a blender was added 114.5 g of a sodium silicate solution (composed of 8.9% $Na_2O$, 28.7% $SiO_2$ and 62.4% $H_2O$), 4.0 g of the slurry of zeolitic nucleation seeds described in Example 1, and 37.7 g of a 50% aqueous solution containing 0.72 mole bis-(2 hydroxyethyl)dimethylammonium iodide. The sodium aluminate and alum solutions described above were then slowly added to the blender with mixing. Sufficient water was added to the blender to bring the total weight of the slurry to 216 g. Then a 200 mg sample of the zeolite ECR-1 obtained from Example 1 which was previously cryochopped (chopped at a temperature of about −196° C.) for 5 mins. under liquid nitrogen was added to the blender to seed the reaction. After thorough homogenization of the mixture it was transferred to a polytetrafluoroethylene-lined pressure reactor, sealed, and placed in a 160° C. oven for twelve days. The white solid product obtained was recovered by filtration, washed with water, and dried in a 110° C. oven. The ECR-1 product obtained had an $SiO_2:Al_2O_3$ ratio of 6.54 as measured by microprobe chemical analysis.

The x-ray powder diffraction pattern for this product is similar to that given in Table II and shows the product to contain a minor amount of analcite contaminant.

EXAMPLE 3

A slurry having the composition, in terms of mole ratios of oxides, of

| | |
|---|---|
| $R_2I_2:Al_2O_3$ | 1.2 |
| $Na_2O:Al_2O_3$ | 1.95 |
| $SiO_2:Al_2O_3$ | 7.5 |
| $H_2O:Al_2O_3$ | 120 | wherein R is a bis(2-hydroxypropyl)dimethyl ammonium cation was prepared as follows: A sodium aluminate solution was made by dissolving 14.5 g (98.3%, 0.356 mole) of NaOH and 16.2 g (0.104 mole) of $Al_2O_3.3H_2O$ in 30 mls $H_2O$. To a blender was added 115.2 g (Ludox HS-40) of a 40% colloidal silica solution, 146.8 g (0.253 mole) of a 50% solution of bis(2-hydroxypropyl)dimethylammonium iodide, 13.7 g of a slurry of zeolitic nucleation seeds as above the sodium aluminate solutions as made above, and 37 mls of $H_2$. After thoroughly homogenizing, the reaction slurry was transferred to four 75 ml stainless steel reaction cylinders, sealed, and placed in 150° C. oven for eight days. The solid product was filtered, washed with distilled water, and dried in 110° C. oven. The dried zeolite obtained was comprised of sheaves of laths about 10 to 20 microns long, had the characteristic x-ray powder diffraction pattern for ECR-1 given in Table 3 together with a minor amount of analcite. The $SiO_2/Al_2O_3$ ratio by microprobe analysis was 6.88.

TABLE 3

X-Ray Diffraction Pattern for Bis(2-hydroxypropyl) Dimethyl Ammonium ECR-1

| 2θ | DÅ | I/Io |
|---|---|---|
| 5.9 | 14.88 | 9 |
| 8.3 | 10.63 | 15 |
| 9.7 | 9.10 | 48 |
| 11.2 | 7.86 | 29 |
| 13.06 | 6.77 | 40 |
| 13.4 | 6.56 | 9 |
| 14.0 | 6.31 | 7 |
| 15.0 | 5.90 | 20 |
| 16.67 | 5.31 | 5 |
| 17.73 | 4.99 | 10 |
| 18.73 | 4.73 | 10 |
| 19.97 | 4.44 | 11 |
| 20.40 | 4.34 | 4 |
| 21.02 | 4.22 | 23 |
| 21.62 | 4.10 | 3 |
| 22.92 | 3.87 | 5 |
| 23.25 | 3.82 | 18 |
| 23.44 | 3.79 | 15 |
| 23.86 | 3.72 | 16 |
| 24.16 | 3.67 | 36 |
| 24.86 | 3.57 | 23 |
| 25.43 | 3.49 | 100 |
| 27.42 | 3.24 | 53 |
| 28.12 | 3.16 | 84 |
| 29.08 | 3.06 | 16 |
| 29.61 | 3.01 | 16 |
| 29.63 | 3.01 | 13 |
| 34.44 | 2.60 | 7 |
| 34.68 | 2.58 | 6 |
| 36.00 | 2.49 | 7 |
| 36.16 | 2.48 | 4 |
| 36.94 | 2.43 | 6 |
| 38.12 | 2.35 | 3 |
| 39.41 | 2.28 | 3 |

We claim as our invention:

1. A synthetic crystalline zeolite characterized by having a composition, in terms of mole ratios of oxides, in the range:

0.5 to $0.02R_2O:0.90$ to $0.98Na_2O:Al_2O_3:5$ to $20SiO_2:xH_2O$ wherein R is a tetraalkyl ammonium cation of the type $(CH_3)_2R_2^1N$, wherein $R^1$ is ethyl, propyl, butyl, hydroxyethyl or hydroxypropyl, and x represents 0 or an integer from 1 to 8, and characterized by an x-ray powder diffraction pattern is essentially identical to that given in Table 1.

2. The zeolite of claim 1 wherein R is partially or fully exchanged with an exchangeable cation selected from Group I through Group VIII of the Periodic Table.

3. The zeolite of claim 1 having a composition in the range:

0.1 to $0.02R_2O:0.95$ to $0.98Na_2O:Al_2O_3:6$ to $10SiO_2$.

4. The zeolite of claim 1 wherein R is bis-(2-hydroxyethyl)dimethyl ammonium.

5. The zeolite of claim 1 wherein R is bis-(2-hydroxypropyl)dimethyl ammonium.

6. A process for preparing a crystalline zeolite comprising:
(a) preparing a reaction mixture comprising an oxide of sodium, a tetraalkyl ammonium salt, water, a source of silica, a source of alumina and sodium aluminosilicate nucleating seeds, said reaction mixture having a composition, in terms of mole ratios of oxides, within the following ranges:

| | |
|---|---|
| $R_2O:Al_2O_3$ | 0.2 to 1.0 |
| $Na_2O:Al_2O_3$ | 1.0 to 7 |
| $SiO_2:Al_2O_3$ | 5 to 20 |
| $H_2O:Al_2O_3$ | 120 to 300 |
| $R_2O:Na_2O$ | 0.05 to 0.4 | where R is a tetraalkyl ammonium cation of the type $(CH_3)_2R_2^1$ wherein $R^1$ is ethyl, propyl, butyl, hydroxyethyl or hydroxypropyl, and said seeds being present in an amount to yield 1 to 15 mole percent of the total alumina content of the reaction mixture;
(b) blending the reaction mixture sufficiently to form a substantially homogeneous mixture;
(c) maintaining the reaction mixture at between about 120° and 200° C. under autogeneous pressure for a sufficient period of time to form crystals of a zeolite having a composition, in terms of mole ratios of oxides, in the range:

0.5 to $0.02R_2O:0.90$ to $0.98Na_2O:Al_2O_3:5$ to $20SiO_2:xH_2O$ where R and x are defined above, and such that the x-ray powder diffraction pattern of said zeolite is essentially identical to that given in Table I, and (d) recovering said zeolite crystals.

7. The process of claim 6 wherein R is bis-(2-hydroxyethyl)dimethyl ammonium.

8. The process of claim 6 where R is bis-(2-hydroxypropyl)dimethyl ammonium.

9. The process of claim 6 further comprising exchanging the R group with an exchangeable cation selected from Group I through Group VIII of the Periodic Table.

10. The process of claim 6 wherein the crystalline zeolite product has a composition in the range:

0.1 to $0.02R_2O:0.95$ to $0.98Na_2O:Al_2O_3:6$ to $10SiO_2$.

11. The process of claim 6 wherein the source of silica is sodium silicate and the sources of alumina are hydrated alumina and an aluminum salt selected from the group consisting of the chloride, sulfate and nitrate salts.

12. The process of claim 6 wherein the reaction mixture is maintained at between 140° and 180° C.

13. The process of claim 6 wherein the seeds are present in an amount to yield 1 to 10 mole percent of the total alumina content of the reaction mixture.

14. The process of claim 6 wherein said seeds comprise the crystalline zeolite product.

15. A process for preparing a crystalline zeolite comprising:

(a) preparing a reaction mixture comprising sodium aluminate, alum, water, sodium, silicate, aluminum sulfate, bis-(2-hydroxyethyl)dimethylammonium halide, and nucleating seeds of the composition:

$13.33Na_2O:Al_2O_3:12.5SiO_2:267H_2O$ said reaction mixture having a composition, in terms of mole ratios of oxides, within the following ranges:

| | |
|---|---|
| $R_2O:Al_2O_3$ | 0.1 to 1.0 |
| $Na_2O:Al_2O_3$ | 1 to 7 |
| $SiO_2:Al_2O_3$ | 5 to 20 |
| $H_2O:Al_2O_3$ | 120 to 300 | where R represents a bis-(2-hydroxyethyl)dimethylammonium group, and said seeds being present in an amount to yield 2 to 6 mole percent of the total final alumina content of the reaction mixture;

(b) blending the reaction mixture sufficiently to form a substantially homogeneous mixture;

(c) maintaining the reaction mixture at between 140° and 200° C. under autogenous pressure for a sufficient period of time to form crystals of a zeolite having a composition, in terms of mole ratios of oxides, in the range:

0.5 to $0.02R_2O:0.95$ to $0.98Na_2O:Al_2O_3:6$ to $10SiO_2$ where R is defined above, and having atoms arranged such that the x-ray powder diffraction pattern of said zeolite is essentially identical to that given in Table I; and (d) recovering said zeolite crystals.

* * * * *